United States Patent [19]
Kawaguchi

[11] Patent Number: 5,720,586
[45] Date of Patent: Feb. 24, 1998

[54] CLIP MOUNTABLE TO A MOUNTING PLATE

[75] Inventor: Kenichiro Kawaguchi, Shizuoka-ken, Japan

[73] Assignee: Yazaki Corporation, Tokyo, Japan

[21] Appl. No.: 742,132

[22] Filed: Oct. 31, 1996

[30] Foreign Application Priority Data

Nov. 2, 1995 [JP] Japan ................... 7-285995

[51] Int. Cl.$^6$ ............................ F16B 19/00; F16L 3/22
[52] U.S. Cl. ................... 411/508; 248/68.1; 248/73; 24/295; 24/627
[58] Field of Search ........................... 411/508, 509, 411/510, 913; 248/68.1, 73, 74.3, 223.41; 24/295, 627; 403/397

[56] References Cited

U.S. PATENT DOCUMENTS

| | | | |
|---|---|---|---|
| 1,690,853 | 11/1928 | Behrman | 411/508 |
| 2,534,690 | 12/1950 | Young | 248/68.1 |
| 4,618,113 | 10/1986 | Reimer | 248/68.1 |
| 5,012,995 | 5/1991 | Ward | 248/68.1 |
| 5,517,731 | 5/1996 | Spykerman | 24/295 |

FOREIGN PATENT DOCUMENTS

| | | |
|---|---|---|
| 63-117225 | 7/1988 | Japan. |
| 2-81255 | 6/1990 | Japan. |
| 5-83565 | 11/1993 | Japan. |

*Primary Examiner*—Flemming Saether
*Attorney, Agent, or Firm*—Finnegan, Henderson, Farabow, Garrett & Dunner, L.L.P.

[57] ABSTRACT

A clip mounted with a mounting plate having opposite walls defining a mounting groove having an opened leading end, the clip is disclosed which has a clip body made of an elastic metal plate, having a V-shape portion with substantially V-shape cross section formed by folding back so as to have two opposite inclined plate portions, the inclined plate potions having opposite slits, respectively, the opposite walls of the mounting plate inserted into the slits, respectively, when the clip body is inserted into the mounting groove from the leading end of the clip body, so that the opposite walls of the mounting groove are inserted into the slits, the mounting plate is engaged with the slits, and a slit start portion adjacent to the leading end of the V-shape potion is elastically supported by the opposite walls of the mounting plate with an elastic force of the opposite inclined plate portions; and a base having a clip-body holding portion for holding the clip body, a harness securing portion which is made of resin and to which a wire harness is secured in a state being out of contact with the clip body, an inclination restraining portion provided in the V-shape portion of the clip body and arranged to be inserted into the mounting groove inserted into the slit to be brought into contact with the inner surface of the mounting groove so as to restrain inclination of the clip holding portion, and a mounting-plate guide for guiding the slits of the clip body pushed into the mounting groove. Therefore, the wire harness can be protected from being damaged and a strong state of mounting can be realized, and incomplete mounting can reliably be prevented with a simple mounting operation. Even if the clip is mounted on the mounting plate portion in a state the mounting plate portion is considerably deviated from the slits, the leading end of the mounting plate portion is guided to the slits by the mounting plate guide portion. As a result, the slit start portion can reliably elastically be supported by the mounting plate portion.

7 Claims, 9 Drawing Sheets

5,720,586

CLIP MOUNTABLE TO A MOUNTING PLATE

BACKGROUND OF THE INVENTION

The present invention relates to a clip for securing a wire harness to a mounting plate portion.

A conventional clip having a structure such that support portion adapted to a member to be attached is made of resin (refer to, for example, Japanese Utility Model Laid-Open No. 2-81255) and another clip having the support portion made of metal (refer to, for example, Japanese Utility Model Laid-Open No. 5-83565) have been known.

However, clips of the foregoing type have the structure such that the force for holding the portion to be mounted is obtained from elastic force generated attributable to elastic deformation of the support portion. Therefore, unintentional shift or excessive looseness sometimes takes place depending upon the direction in which the force is added to the clip.

SUMMARY OF THE INVENTION

An object of the present invention is to provide a clip capable of being free from deviation and excessive loosenes against force regardless of the direction of the force.

To achieve the foregoing object, according to one aspect of the present invention, there is provided a clip mounted with a mounting plate having opposite walls defining a mounting groove having an opened leading end. A clip body made of an elastic metal plate, has a V-shape portion with substantially V-shape cross section formed by folding back, so as to have two opposite inclined plate portions, the inclined plate portions having opposite slits, respectively, the opposite walls of the mounting plate inserted into the slits, respectively, when the clip body is inserted into the mounting groove from the leading end of the clip body, so that the opposite walls of the mounting groove are inserted into the slits, the mounting plate is engaged with the slits, and a slit start portion adjacent to the leading end of the V-shape portion is elastically supported by the opposite wall of the mounting plate with an elastic force of the opposite inched plate portions. A base has a clip-body holding portion for holding the clip body, a harness securing portion which is made of resin and to which a wire harness is secured in a state being out of contact with the clip body, an inclination restraining portion provided in the V-shape portion of the clip body and arranged to be inserted into the mounting groove inserted into the slit to be brought into contact with the inner surface of the mounting groove so as to restrain inclination of the clip holding portion, and a mounting-plate guide for guiding the slits of the clip body pushed into the mounting groove.

The clip according to the present invention has the structure such that the wire harness is secured to the harness securing portion made of resin in a state being out of contact with the clip body so that the secured wire harness is protected from being damaged.

To mount the clip on the mounting plate portion, the clip body is, from the leading end of the V-shape portion, inserted into the mounting groove to align the slit to the mounting plate portion. In a state where the clip according to the present invention is mounted, the mounting plate portions are engaged to the slits. The elastic force of the inclined plate portions enables the slit start portion adjacent to the leading end of the V-shape portion to be elastically supported by the opposite wall of the mounting groove. Since the inclination restraining portion is inserted into the mounting groove inserted into the slit, the engagement between the slit start portion and the opposite walls prevents shift and looseness against force acting in a direction opposite to the insertion direction, the engagement between the slits and the mounting plate portion prevents the same against force acting in a direction intersecting the mounting plate portion, and the contact between the slit and the mounting plate portion prevents the same against force acting in a direction intersecting the inclined plate portion. Therefore, a strong holding state can be realized. Therefore, a strong mounting state can be realized regardless of the direction of the force.

Even if the clip is mounted on the mounting plate portion in a state where the mounting plate portion and the slit are deviated considerably, the leading end of the mounting plate portion is guided to the slit by the mounting-plate guide. Therefore, the opposite walls of the mounting groove are inserted into the slit so that the slit start portion is reliably elastically supported by the mounting plate portion. As a result, incomplete mounting can reliably be prevented with a simple mounting operation.

The clip-body holding portion may have an insertion base portion extended into the V-shape portion of the clip body and having a leading end facing the inner surface the leading end of the V-shape portion, and a clip-body inclination restraining portions formed on the two sides of the V-shape cross section of the clip body and arranged to be brought into contact with the inclined plate portion of the clip body so as to restrain inclination of the clip body relative to the leading end of the insertion base portion, and the mounting-plate guide is provided for the clip-body inclination restraining portion.

As a result, inclination of the clip body substantially relative to the leading end of the insertion base portion can be restrained by the clip-body inclination restraining portion. Therefore, suspension of engagement between the tags and the engaging projection due to the inclination of the inclined plate portion before mounting to the mounting groove can be prevented. Thus, the operation for mounting the clip on the mounting plate portion can easily be performed.

Moreover, the slits may have a receiving portion expanding toward the leading end of the V-shape portion.

Thus, even if the clip is mounted on the mounting plate portion in a state where the mounting plate portion is considerably deviated from the slits, the opposite walls of the mounting groove are inserted into the receiving portion. As a result, leading ends of the opposite walls inserted into the receiving portion are inserted into the slit adjacent to the leading end of the insertion from the receiving portion. Therefore, the slit start portion can reliably elastically be supported by the mounting plate portion. Thus, mounting in an incomplete state can reliably be prevented with a simple mounting operation.

DESCRIPTION OF THE PREFERRED EMBODIMENTS

A first embodiment of the present invention will now be described with reference to the drawings.

Figure 1:
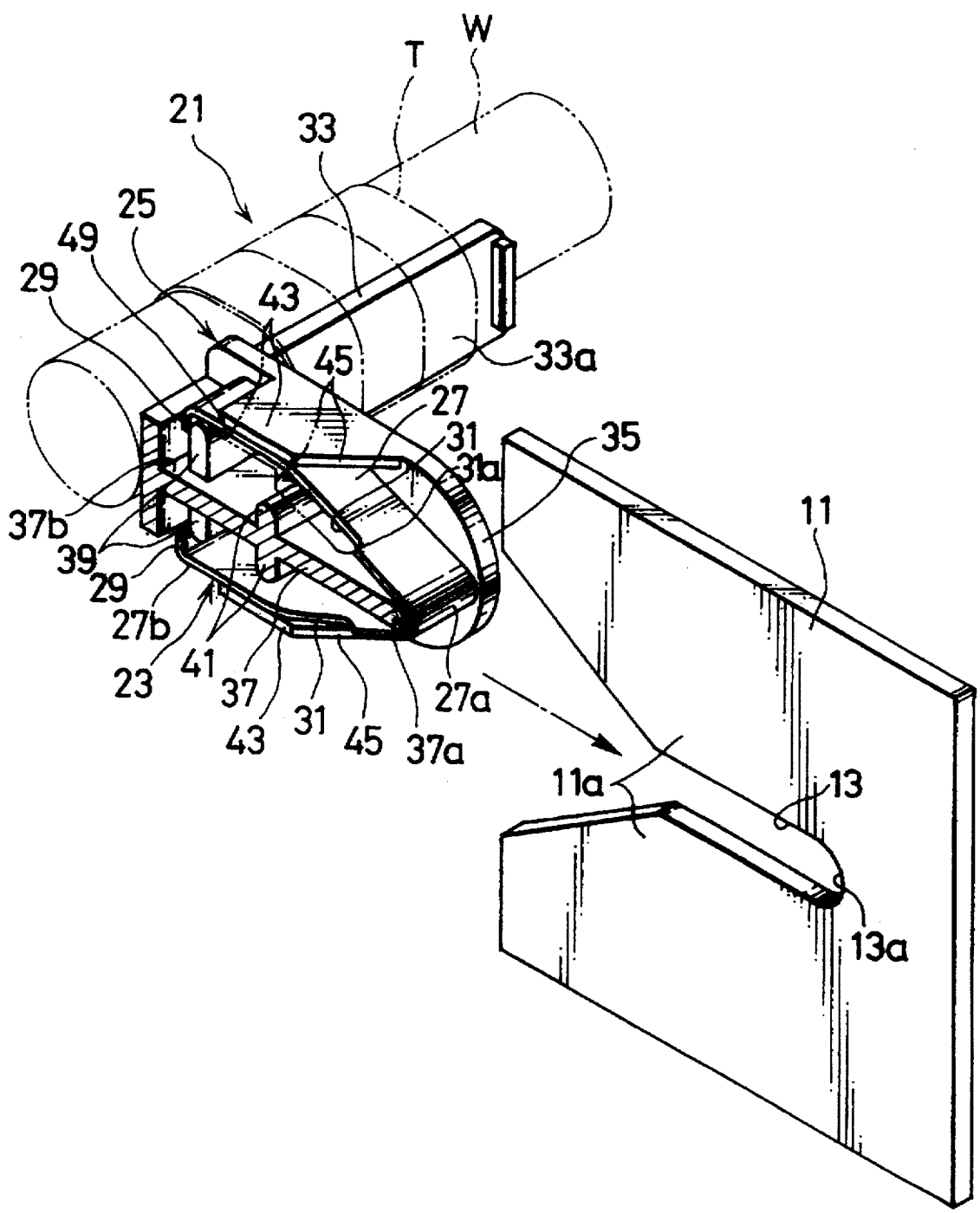
FIG. 1 is a perspective cress sections view showing an essential portion of a clip according to a first embodiment of the present invention.
Figure 2:
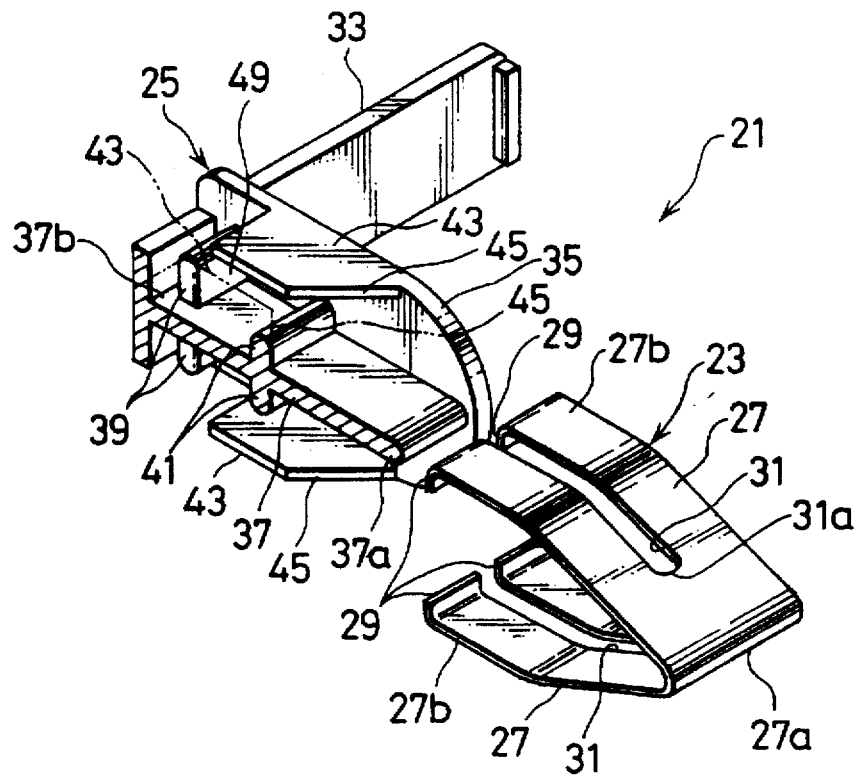
FIG. 2 is an exploded perspective view showing the clip shown in FIG. 1.
Figure 3:
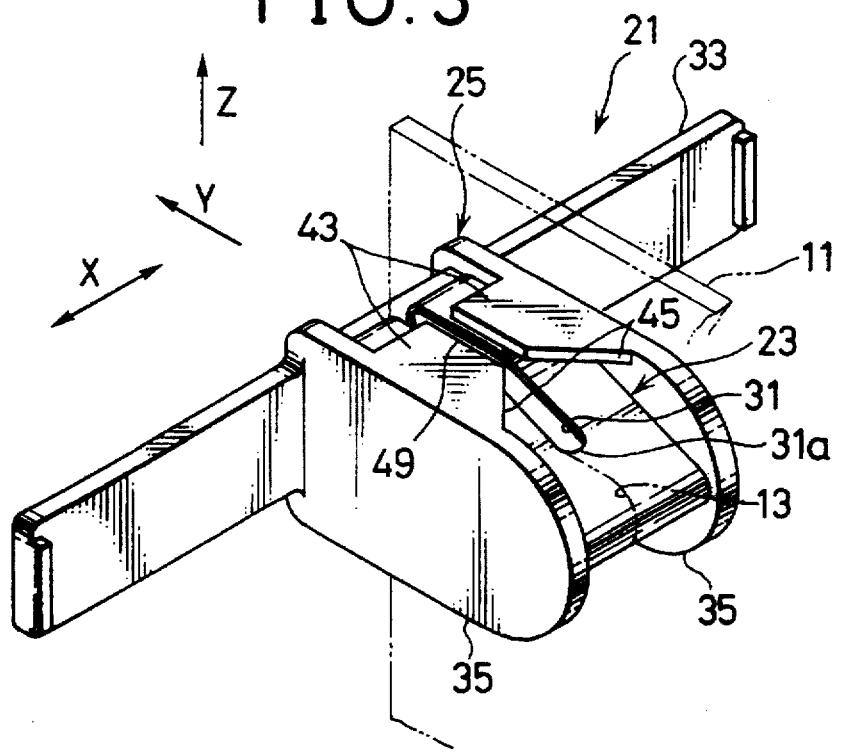
FIG. 3 is a perspective view showing an assembled clip shown in FIG. 1.
Figure 4:
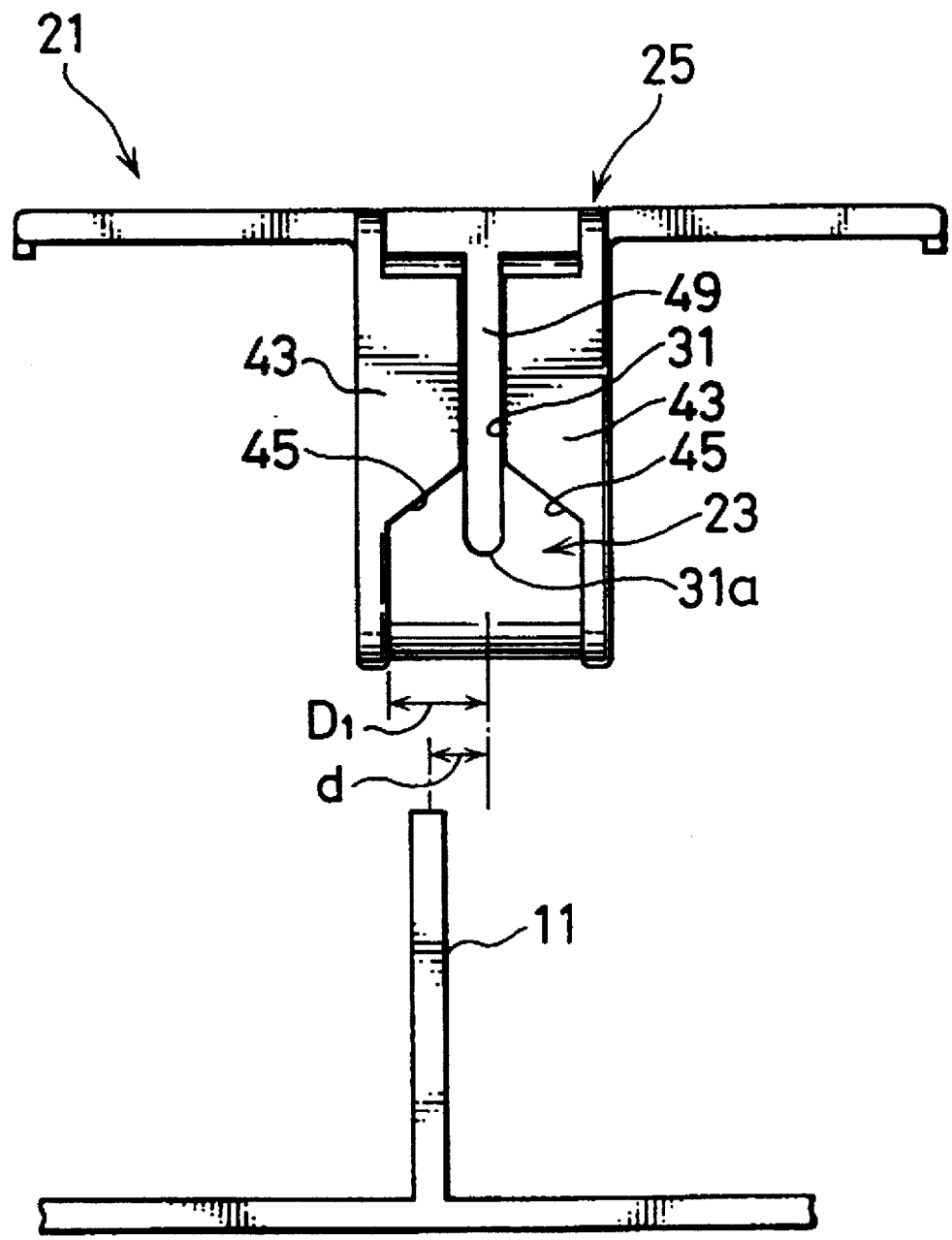
FIG. 4 is a front view showing a state where the clip shown in FIG. 1 is inserted while being shifted from the mounting plate portion.
Figure 5:
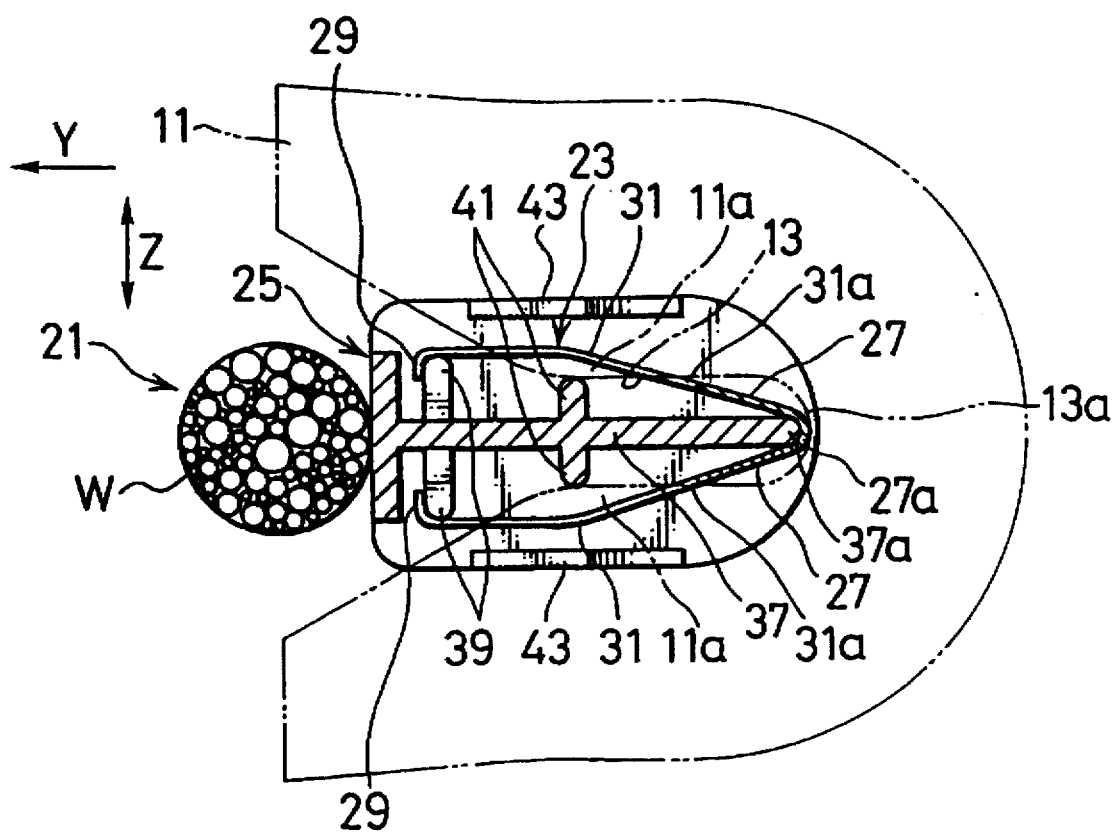
FIG. 5 is a side cross sectional view showing a state where the clip shown in FIG. 1 is mounted.

FIG. 1 is a perspective cross sectional view showing an essential portion of a clip according to the first embodiment of the present invention. FIG. 2 is an exploded perspective view showing the clip shown in FIG. 1. FIG. 3 is an assembly perspective view showing the clip shown in FIG. 1. FIG. 4 is a front view showing a state where the clip shown in FIG. 1 is shifted from a mounting plate portion when inserted. FIG. 5 is a side cross sectional view showing a state where the clip shown in FIG. 1 is mounted.

As shown in FIGS. 1 to 3, a clip 21 is composed of a metal clip body 23 formed by bending an elastic metal plate and a resin base 25. A mounting plate 11, on which the clip 21 is mounted, has a mounting groove 13 having an opened leading end.

The clip body 23 has a V-shape portion with substantially V-shape cross section having two opposite inclined plate portions 27 formed by folding back. The portions (opposite to the V-shape leading end) of the two inclined portions 27 adjacent to end portions 27b are formed to substantially run parallel to each other. Opposite projecting tags 29 are formed at the leading ends of the ends 27b by bending the ends 27b.

The two opposite inclined plate portions 27 have slits 31 each having a width slightly larger than the thickness of the mounting plate 11, the slits 31 extending in a direction from the V-shape leading end 27a toward the tags 29 while facing each other. When the clip body 23 is pushed inwards from the V-shape leading end 27a, opposite walls 11a of the mounting groove 13 are inserted into the slits 31, so that the mounting plate 11 is engaged. Moreover, the elastic force of the clip body 23 (the inclined plate portions 27) having two inclined surfaces causes a slit start portion 31a adjacent to the V-shape leading end 27a to be held by the opposite wall 11a of the mounting groove 13.

The base 25 has a plate-like harness securing portion 33 to which a wire harness W is secured by a tape T or the like, a clip holding portion consisting of side plate portions 35 for holding the clip body 23, an insertion base portion 37, engaging projections 39 and clip-inclination restraining portions 43, and inclination restraining portions 41 for restraining inclination of the clip holding portion.

The side plate portions 35 and the insertion base portion 37 are substantially stood erect from a surface 33a of the harness securing portion 33.

The insertion base portion 37 is formed into a flat plate shape having a width slightly larger than the width of the clip body 23 and a length which enables an erected base end 37b to be exposed outside over the clip body 23 when the clip body 23 is inserted from the tags 29 along the V-shape opposite surface of the clip body 23 to bring the leading end 37a into contact with the inside portion of the V-shape leading end 27a. That is, the insertion base portion 37 is, in the foregoing state of insertion, extended from the harness securing portion 33 to the inside portion of the V-shape space in the clip body 23 so that the leading end 37a faces the inner surface of the V-shape leading end 27a.

The side plate portions 35 are formed on the two sides of the insertion base portion 37 in the widthwise direction. The widthwise two side portions of the insertion base portion 37 are substantially perpendicularly brought into contact with the inner surfaces of the side plate portions 35 so as to be connected to one another. As a result, the side plate portions 35 are positioned on the two sides of the insertion base portion 37 in the widthwise direction when the insertion base portion 37 has been inserted into the inside space of the V-shape portion of the clip body 23 so as to restrain the widthwise movement of the clip base 23. That is, the side plate portions 35 forms a movement restraining portion.

The engaging projections 39 are formed to vertically project from the right and reverse surfaces of the insertion base portion 37 adjacent to the erected base end 37b. The leading ends of the engaging projections 39 are positioned on the bent inside portions of the two tag portions 29 to engage the tag portions 29 when the leading end 37a of the insertion base portion 37 has been inserted into the inside portion of the V-shape leading end 27a of the clip body 23. When the clip body (the inclined plate portions 27) having two inclined surfaces is elastically deformed inwards toward the inside portion of the V-shape portion, the engaging projections 39 are brought into contact with portions adjacent to the tags 29 of the clip body 23 having two inclined surfaces to support the same.

The inclination restraining portions 41 are formed to vertically project from the right side and the reverse side of an intermediate portion of the insertion base portion 37. The inclination restraining portions 41 are inserted into a mounting groove 13 which is inserted into the slit 31 in a state where the clip body 23 is pushed into the mounting groove 13 so as to be brought into contact with the inner surface of the mounting groove 13 to prevent inclination of the base 25.

The clip-inclination restraining portions 43 are formed into plate-like shapes projecting from the two side plate portions 35 so as to be positioned on the two sides of the V-shape portion into which the insertion base portion 37 has been inserted. The clip-inclination restraining portions 43 are brought into contact with the inclined plate portions 27 having two inclined surfaces of the clip body 23 to prevent inclination of the clip body 23 substantially relative to the leading end 37a of the insertion base portion 37.

A gap 49 having a width slightly larger than the width of the slit 31 of the clip body 23 is formed between the two clip-inclination restraining portions 43. The clip-inclination restraining portions 43 have mounting-plate guides 45 formed in the portions to which portions to which the harness is secured (portions of the clip body 23 adjacent to the V-shape leading end 27a). The mounting-plate guides 45 are inclined from the gap 49 toward the side plate portions 35 so as to guide the slits 31 of the clip body 23 to the mounting plate 11.

The clip 21 is assembled in such a manner that the insertion base portion 37 of the base 25 is, along the symmetrical surfaces forming the V-shape of the clip body 23, inserted from the portion adjacent to the tags 29 into the space in the V-shape portion to position the engaging projections 39 in the inside portions of the tags 29. Moreover, the leading end 37a of the insertion base portion 37 is caused to face the inner surface of the V-shape leading end 27a of the clip body 23. In the foregoing state, movement of the clip body 23 with respect to the base 25 in the direction toward the V-shape leading end 27a is restrained attributable to the engagement between the engaging projections 39 and the tags 29. Movement of the same into a direction toward the tags 29 is restrained attributable to the contact between the leading end 37a of the insertion base portion 37 and the inner surface of the V-shape leading end 27a. Movement of the same in the widthwise direction is restrained attributable to the contact between the two side portions of the inclined plate portion 27 having two inclined surfaces and the side plate portions 35. As a result, the clip body 23 is held by the base 25. In the above-mentioned state where the clip body 23 is held by the base 25, the harness securing portion 33 is positioned apart from the clip body 23 so that the wire harness W and the tape T secured to the harness securing portion 33 are not in contact with the clip body 23.

The operation of this embodiment will now be described.

To mount the clip 21 on the mounting plate 11, the base 25 is depressed to insert the clip body 23 into the mounting groove 13 from the V-shape leading end 27a. When the clip body 23 has been inserted into the mounting groove 13, the inclined plate portion 27 having two inclined surfaces is, as shown in FIG. 5, elastically deformed to the inside portion of the V-shape portion so that the opposite walls 11a of the mounting groove 13 are inserted into the slits 31. Moreover, the mounting plate 11 is engaged to the slits 31. The elastic force of the clip body 23 (the inclined plate portions 27) having two inclined surfaces causes the slit start portion 31a adjacent to the V-shape leading end 27a to be elastically supported by the opposite walls 11a of the mounting groove 13. Moreover, inclination restraining portions 41 are inserted into the mounting groove 13 inserted into the slits 31 so that the state of mounting is realized.

The thus-mounted clip 21 is strongly held against force in the direction opposite to the insertion direction (in a direction indicated by an arrow Y shown in FIGS. 3 and 5) attributable to the engagement between the slit start portion 31a and the opposite walls 11a and against force in a direction (in a direction indicated by an arrow X shown in FIG. 3) intersecting the mounting plate 11 attributable to the engagement between the slits 31 and the mounting plate 11.

The inclination restraining portion 41 and the inner surface of the mounting groove 13 are brought into contact with each other so that inclination of the base 25 against force in a direction (in a direction indicated by an arrow Z shown in FIGS. 3 and 5) intersecting the clip body 23 having two inclined surfaces is restrained. As a result, the clip 21 is strongly held by the mounting plate 11.

That is, the above-mentioned clip 21 enables a strong state of mounting to be realized without shift or looseness against force applied regardless of the direction.

Since the resin harness securing portion 33, in which the wire harness W is secured to the clip body 23 in a non-contact manner, is provided, the wire harness W and the tape T can be protected from being damaged.

Since a portion adjacent to the tags 29 having two inclined surfaces, which has been elastically deformed, is supported by the engaging projections 39, the elastic force generated owning to the clip body 23 having two inclined surfaces can be enlarged. As a result, the force of the mounting groove 13 for elastically supporting the slit start portion 31a with respect to the opposite walls 11a can be enlarged. Thus, a stronger state of mounting can be realized.

Note that the inclination restraining portion 41 and the inner surface of the mounting groove 13 are formed extremely adjacent to each other to immediately bring the inclination restraining portion 41 and the mounting groove 13 into contact with each other so that inclination of the base 25 is furthermore reliably restrained. As a result, generation of looseness of the clip 21 with respect to the mounting plate 11 can reliably be restrained.

Even if the clip 21 is mounted on the mounting plate 11 in a state where great deviation d between the mounting plate 11 and the slits 31 is maintained as shown in FIG. 4, the leading end of the mounting plate 11 is guided into the slits 31 attributable to the mounting-plate guides 45 if the deviation d is within range D1 in which the mounting-plate guides 45 is formed. Therefore, the opposite walls 11a of the mounting groove 13 are inserted into the slits 31 as shown in FIG. 5 so that the slit start portion 31a is reliably and elastically supported by the mounting plate 11.

Therefore, even in a case where the mounting plate 11 is formed at a position at which the slits 31 cannot visually be aligned, incomplete mounting of the clip 21 can reliably be prevented with a simple mounting operation.

Since inclination of the clip body 23 substantially relative to the leading end 37a of the insertion base portion 37 in a state of assembly in which the insertion base portion 37 has been inserted into the inside portion of the V-shape portion of the clip body 23 can be restrained by the clip-inclination restraining portion 43, intentional separation of the engaged tags 29 and the engaging projection 57 due to the inclination of the clip body 23 having two inclined surfaces before the clip 21 is mounted on the mounting plate 11 can be prevented. Therefore, separation of the clip body 23 from the base 25 can reliably be prevented. As a result, the operation for mounting the clip 21 on the mounting plate 11 can easily be performed.

A second embodiment of the present invention will now be described with reference to FIGS. 6 to 9.

Figure 6:
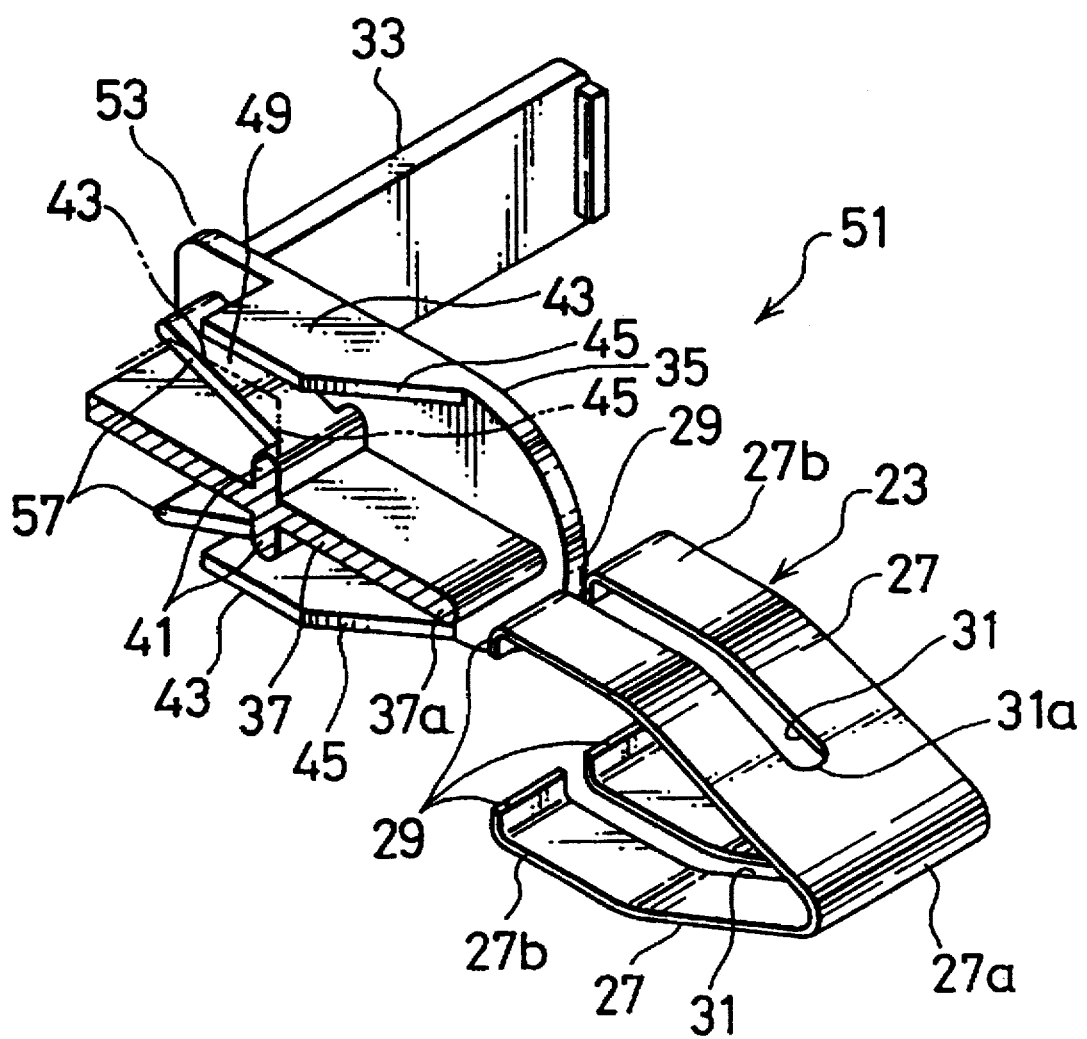
FIG. 6 is an exploded perspective view showing a clip according to a second embodiment of the present invention.
Figure 7:
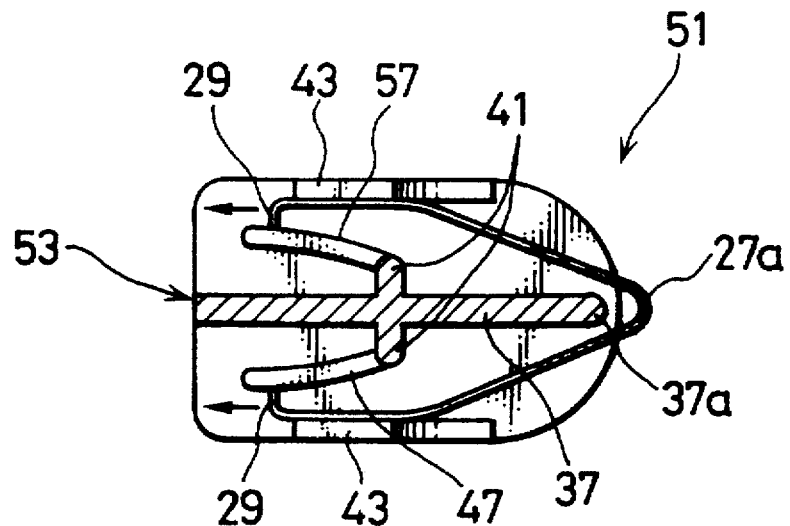
FIG. 7 is a cross sectional view showing an intermediate moment during an operation for assembling the clip shown in FIG. 6.
Figure 8:
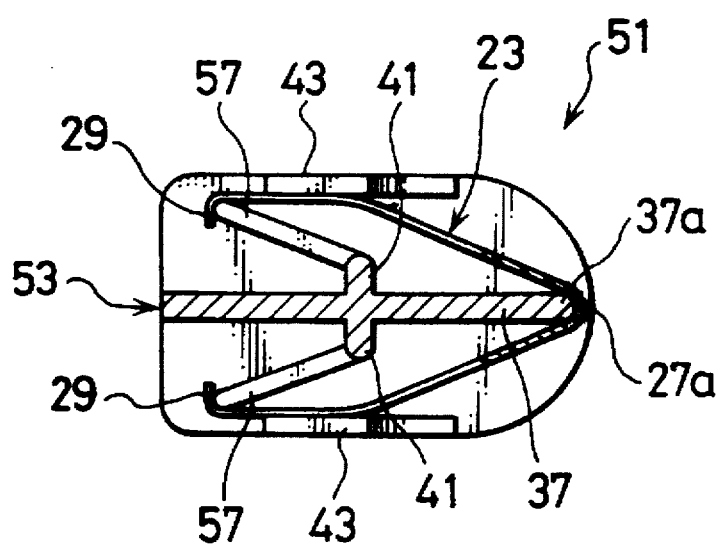
FIG. 8 is a cross sectional view showing an assembled clip shown in FIG. 6.
Figure 9:
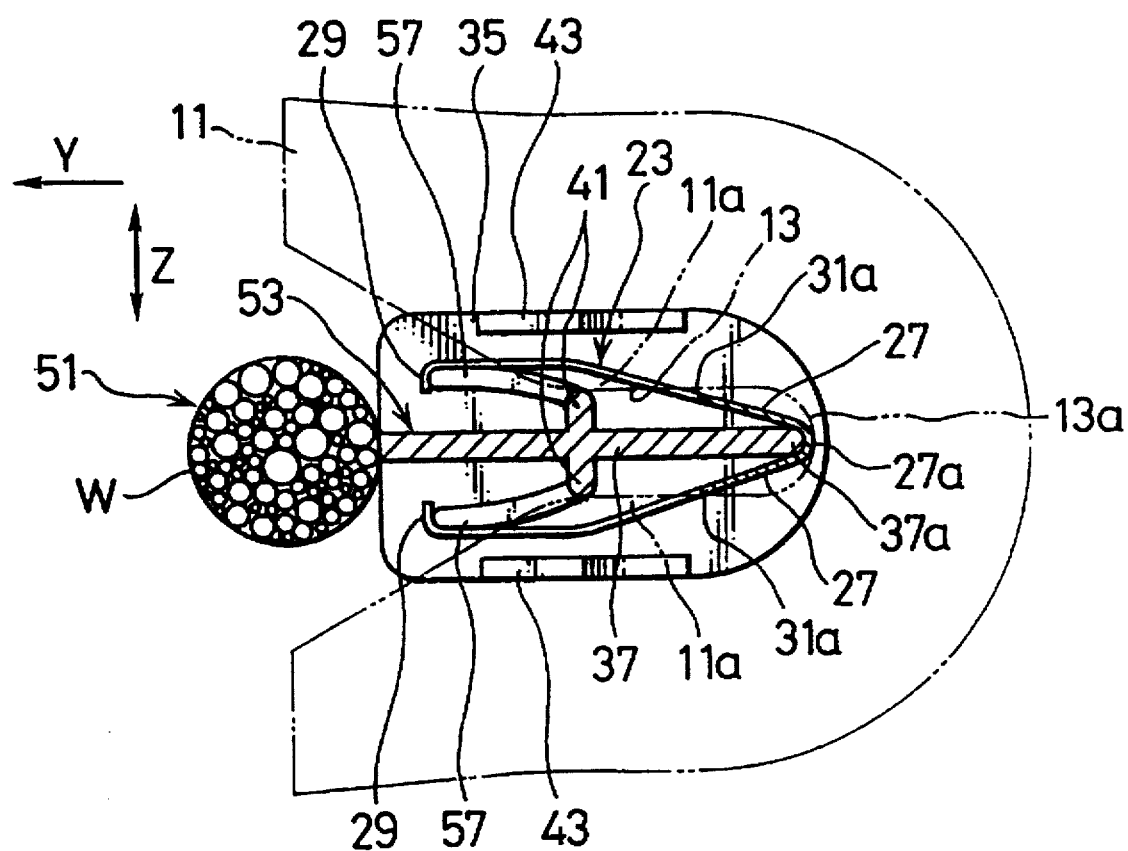
FIG. 9 is a side cross sectional view showing a state where the clip shown in FIG. 6 is mounted.

FIG. 6 is an exploded perspective view showing a clip according to this embodiment. FIG. 7 is a cross sectional view showing a state where a process for assembling the clip shown in FIG. 5 is being performed. FIG. 8 is a cross sectional view showing the clip shown in FIG. 5 has been assembled. FIG. 9 is a side cross sectional view showing a state where the clip shown in FIG. 5 has been mounted. Note that similar elements to those according to the first embodiment are given the same reference numerals and the similar elements are omitted from description.

This embodiment has a structure which is a modification of the first embodiment such that the engaging projection 39 according to the first embodiment is, as shown in FIG. 6, formed into a flexible engaging projection 57.

The engaging projection 57 provided for a base member 53 of a clip 51 is formed to diagonally project from the inclination restraining portion 41 (a position adjacent to the leading end 37a of the insertion base portion 37) toward the base end 37b so as to be in contact with the leading end of the V-shape portion of the tags 29 of the clip body 23.

According to this modification, the engaging projection 57, which is brought into contact with the tags 29, is deflected inwards when the insertion base portion 37 of the base 25 is inserted into the portion in the V-shape portion of the clip body 23 as shown in FIG. 7 so as to guide the tags 29, which slide on the inner surface of the clip-inclination restraining portion 43. The foregoing insertion operation can easily be performed, in addition to the effect of the first embodiment. Therefore, the clip 51 can easily be assembled.

A third embodiment of the present invention claimed m claim 3 or claim 4 will now be described with reference to FIGS. 10 to 12.

Figure 10:
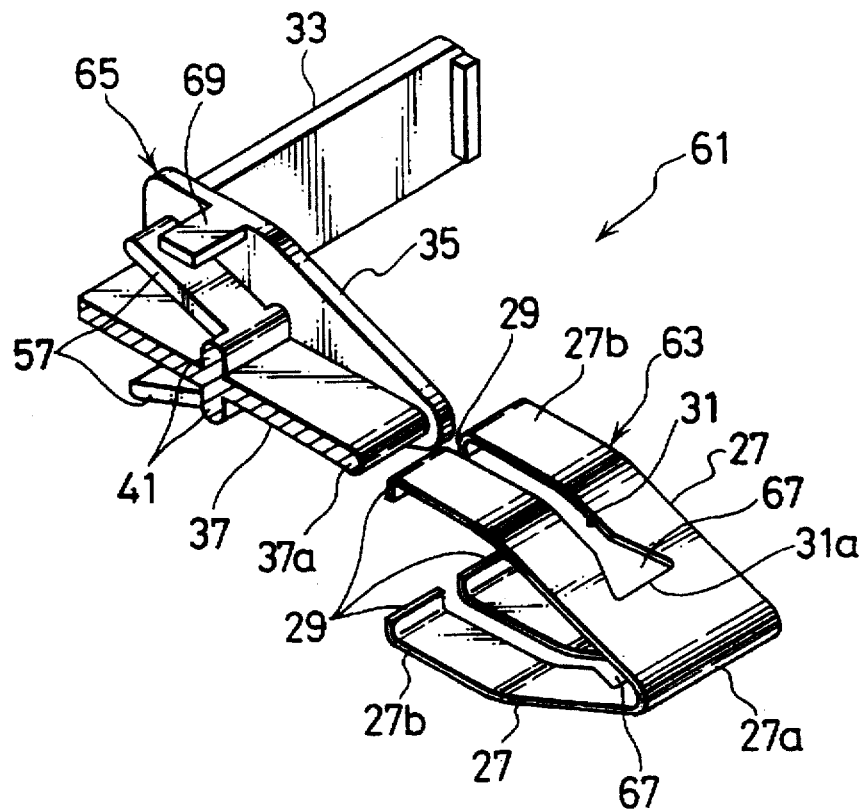
FIG. 10 is an exploded perspective view showing a clip according to a third embodiment of the present invention.

FIG. 10 is an exploded perspective view showing a clip according to this embodiment. FIG. 11 is a perspective view showing an assembled clip shown in FIG. 10. FIG. 12 is a front view showing a state where the clip shown in FIG. 10 is shifted from the mounting plate portion when inserted. Note that similar elements to those according to the first embodiment or the second embodiment are given the same reference numerals and the similar elements are omitted from description.

Figure 11:
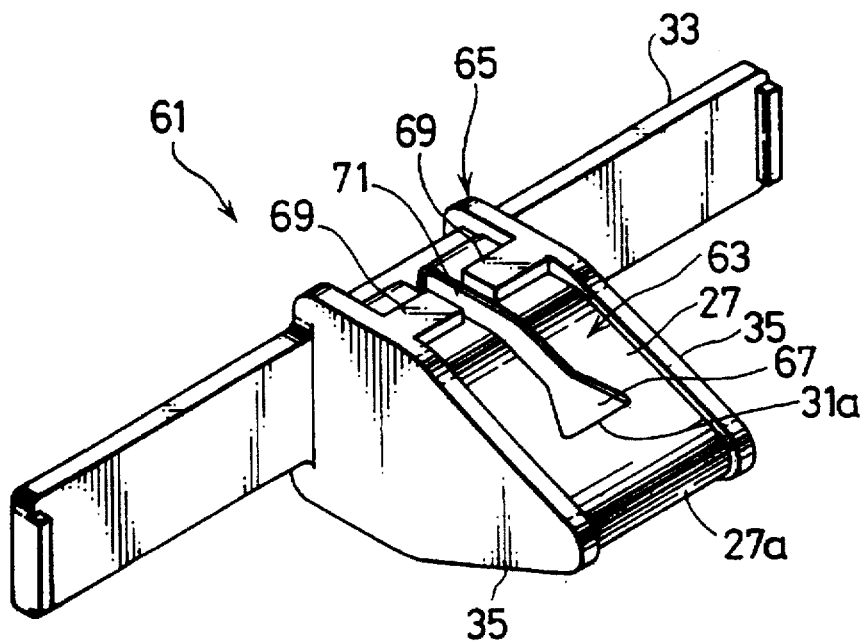
FIG. 11 is a perspective view showing an assembled clip shown in FIG. 10.

This embodiment has, as shown in FIGS. 10 and 11, a structure such that receiving portions 67 expanding toward the V-shape leading end 27a are provided for the slits 31 of a clip body 63. That is, the leading end 31a of the V-shape portion of the slit 31 is formed into a straight portion having a length longer than the width of the slit 31 adjacent to the tag 29, and the width of the leading end 31a is reduced so as to be continued to the slit 31 adjacent to the tag 29.

Note that a clip-inclination restraining portion 69 of a base 65 is not provided with the mounting-plate guides 45 which is provided for the structure according to the first and second embodiments.

Figure 12:
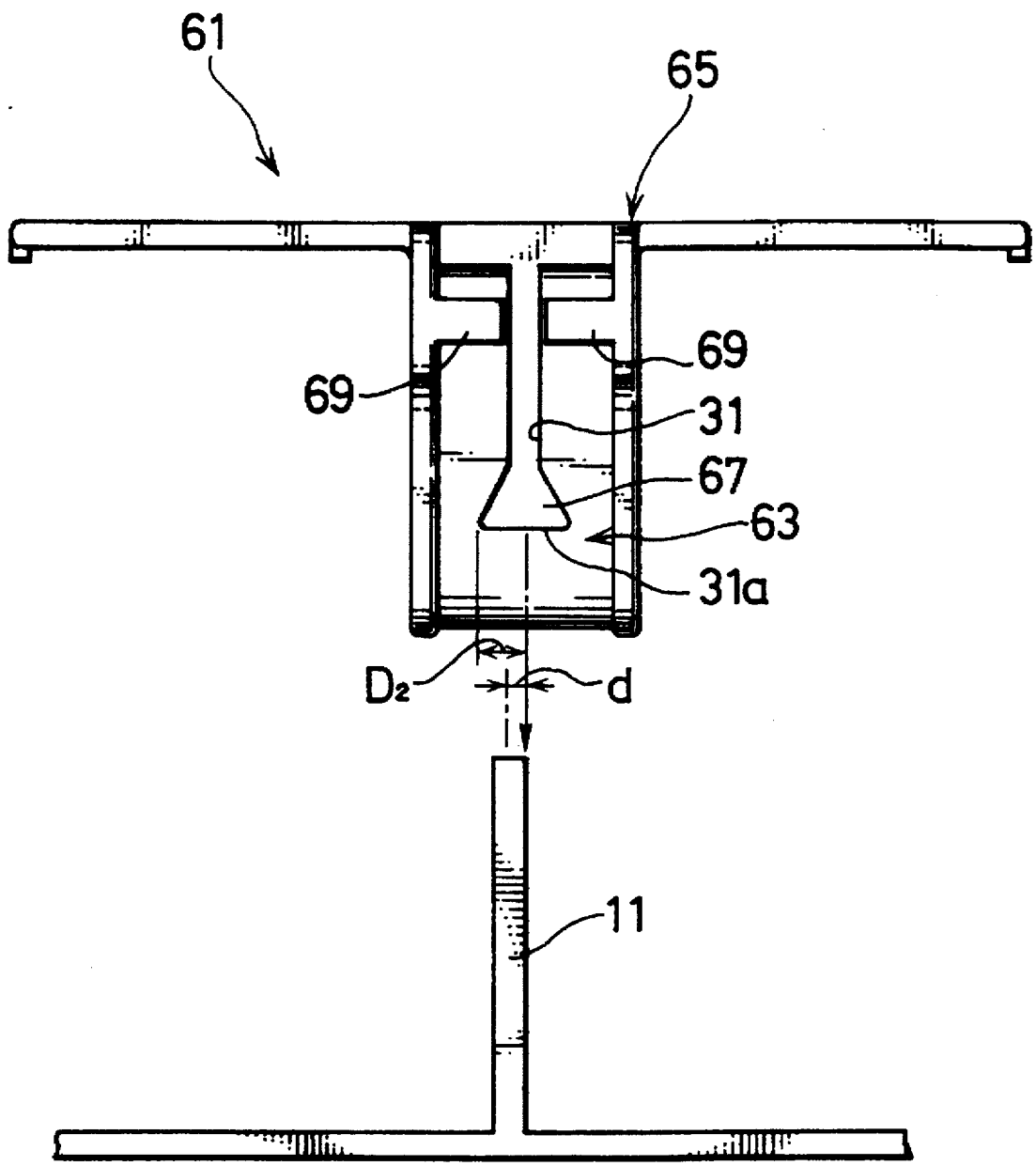
FIG. 12 is a front view showing a state where the clip shown in FIG. 10 is inserted while being deviated from the mounting plate portion.

According to this embodiment, the receiving portion 67 expanding toward the V-shape leading end 31a is provided for the slit 31, as shown in FIG. 12. Therefore, even if the clip 21 is mounted on the mounting plate 11 in a state where a great deviation d between the mounting plate 11 and the slits 31 is maintained, the opposite walls 11a of the mounting groove 13 are inserted into the receiving portion 67 if the deviation d is within range D2 in which the receiving portion 67 is formed. Therefore, the opposite walls 11a inserted into the receiving portion 67 are inserted into the slit 31 adjacent to the tags 29 (adjacent to the leading end for insertion). As a result, the slit start portion 31a can reliably elastically be supported by the mounting plate 11.

Therefore, even if the mounting plate 11 is provided for a position at which the slits 31 cannot visually be aligned, incomplete mounting of the clip 61 can reliably be prevented with a simple mounting operation.

Also according to this embodiment, the secured wire harness W is not damaged and the mounted clip 61 can strongly be held against force applied regardless of the direction, similarly to the first and second embodiments.

Even if the clip is the clip 21 having the engaging projection 39, which is not a flexible element, similarly to the first embodiment, provision of the receiving portion 67 similar to that according to this embodiment enables incomplete mounting of the clip 61 to be reliably be prevented with a simple mounting operation.

What is claimed is:

1. A clip mountable to a mounting plate having opposite walls defining a mounting groove having an opened leading end, said clip comprising:

a clip body made of an elastic plate, having a generally V-shaped portion with a substantially V-shaped cross section defined by two opposite inclined plate portions, said inclined plate portions having opposite slits, respectively, positioned to receive the opposite walls of the mounting plate therein when said clip body is inserted into the mounting groove and a slit start portion adjacent to a leading end of said V-shaped portion is elastically supported by the opposite walls of the mounting plate with an elastic force of said opposite inclined plate portions; and a base having a holding portion for holding said clip body, a harness securing portion for securing a wire harness out of contact with said clip body, an inclination restraining portion provided in said generally V-shaped portion of said clip body and arranged to be brought into contact with the inner surface of the mounting groove when the clip body is inserted into the mounting groove and thereby restrain inclination of said holding portion, and a mounting-plate guide for guiding said slits of said clip body when the clip body is pushed into the mounting groove.

2. A clip according to claim 1, wherein said holding portion has an insertion base portion extended into said generally V-shaped portion of said clip body and a leading end facing an inner surface of the leading end of said generally V-shaped portion, and inclination restraining portions formed on two sides of said V-shaped cross section of said clip body arranged to be brought into contact with said inclined plate portion of said clip body so as to restrain inclination of said clip body relative to the leading end of said insertion base portion, and said mounting-plate guide is provided for said inclination restraining portion.

3. A clip according to claim 1, wherein said harness securing portion is made of resin.

4. A clip according to claim 1, wherein said clip body is made of metal.

5. A clip mountable to a mounting plate having opposite walls defining a mounting groove having an opened leading end, said clip comprising:

a clip body made of an elastic plate, having a generally V-shaped portion with a substantially V-shaped cross section defined by two opposite inclined plate portions, said inclined plate portions having opposite slits, respectively, said slits having receiving portions expanding toward a leading end of said generally V-shaped portion, said slits being positioned to receive the opposite walls of the mounting plate therein when said clip body is inserted into the mounting groove and a slit start portion adjacent to the leading end of said generally V-shaped generally portion is elastically supported by the opposite walls of the mounting plate with an elastic force of said opposite inclined plate portions; and a base having a holding portion for holding said clip body, a harness securing portion for securing a wire harness out of contact with said clip body, and an inclination restraining portion provided in said generally V-shaped portion of said clip body and arranged to be brought into contact with the inner surface of the mounting groove when the clip body is inserted into the mounting groove and thereby restrain inclination of said holding portion.

6. A clip according to claim 5, wherein said harness securing portion is made of resin.

7. clip according to claim 5, wherein said clip body is made of metal.

* * * * *

UNITED STATES PATENT AND TRADEMARK OFFICE
CERTIFICATE OF CORRECTION

PATENT NO. : 5,720,586
DATED : February 24, 1998
INVENTOR(S) : Kenichiro KAWAGUCHI It is certified that error appears in the above-indentified patent and that said Letters Patent is hereby corrected as shown below:

On the Title Page, Item [57], in the Abstract,
    line 5, after "back", insert --,--;
    line 7, "potions" should read --portions--; and
    line 14, potion" should read --portion--.

Claim 5, column 8, line 48, after "V-shaped", delete "generally".

Claim 7, column 8, line 64, before "clip" (first occurrence), insert --A--.

Signed and Sealed this

Sixth Day of April, 1999

Q. TODD DICKINSON

Attest:

Attesting Officer

Acting Commissioner of Patents and Trademarks